United States Patent Office 3,645,950
Patented Feb. 29, 1972

3,645,950
STABILIZATION OF POLY(ETHYLENE OXIDE)
J John Stratta, New York, N.Y., assignor to Union
Carbide Corporation, New York, N.Y.
No Drawing. Filed Mar. 28, 1969, Ser. No. 811,657
Int. Cl. C08f 45/56, 45/62; C08g 51/56
U.S. Cl. 260—29.2
3 Claims

ABSTRACT OF THE DISCLOSURE

Process for stabilizing aqueous solutions of poly(ethylene oxide) by incorporating a stabilizing amount of manganous ion in the aqueous solution.

---

The present invention relates to poly(ethylene oxide) and more particularly to a process for stabilizing poly (ethylene oxide) in aqueous solution.

Poly(ethylene oxide) finds many unique applications because of its extremely high molecular weight. Merely as illustrative poly(ethylene oxide) of about ten million molecular weight, when added to water in an amount of about 1% by weight, can increase the viscosity of the water five thousand to ten thousand fold or more. Unfortunately, however, solution viscosity is extremely sensitive to changes in polymer molecular weight, and unstabilized poly(ethylene oxide) polymers frequently degrade in aqueous solution to yield intolerable viscosity losses. It is of course, well known that a stable high molecular weight poly(ethylene oxide) polymer is a necessary prerequisite for the polymer to function adequately as a hydrodynamic friction reducing agent, as a flocculating agent and to a lesser degree as a film former.

Attempts have been made to stabilize aqueous poly (ethylene oxide) solutions without appreciable success particularly when attempts were made to stabilize aqueous poly(ethylene oxide) solutions in the acid pH region. Unfortunately, however, the polymer must be stabilized under such acidic conditions so that it can successfully thicken or gel acidic solutions used to etch rocks or clean metal, etc., or function as a flocculating agent to precipitate suspended solids from acid-mine water wastes.

Many substances known to effectively stabilize poly (ethylene oxide) in organic solvents or in the bulk polymer state are insoluble in water or may actually promote polymer degradation in aqueous solution. As an example, 1,1-diphenyl-2-picrylhydrazine and the corresponding hydrazyl have been reported to be good ultraviolet stabilizers for poly(ethylene oxide) dissolved in methylene chloride but they are not soluble enough to provide adequate protection in aqueous solution. Compounds such as phenothiazine are highly effective in stabilizing molten poly(ethylene oxide) against thermal degradation, yet in water solution these same compounds catalyze the degradation of poly(ethylene oxide). In addition, certain chelating agents such as the disodium salt of ethylenediaminetetra-γ-acetic acid which have been successfully employed to promote poly(ethylene oxide) stability in anhydrous systems by effectively chelating dissolved metal ions, can actually promote degradation in aqueous solution.

At present, certain alcohols such as isopropanol, ethanol, amyl alcohol and certain diols such as ethylene glycol and propylene glycol can be effectively used to protect dissolved poly(ethylene oxide) against ultraviolet induced degradation or degradation occurring in acid solution. It has been suggested that these hydroxy compounds all have easily extracted protons and are therefore preferentially oxidized to monomeric hydroperoxides which do not decompose to infect the poly(ethylene oxide). However, these "sacrificial" stabilizers are generally used at levels of about five percent based on the total solution and the amount of stabilizer frequently exceeds the amount of polymer to be protected. In many applications, such high alcohol concentrations cannot be tolerated, i.e., the order of 5 vol. percent isopropanol is not acceptable in some perfumed cosmetic applications.

Aqueous poly(ethylene oxide) solutions are quite stable at high pH values of about eight or more and it has been disclosed that the use of phosphate and borate buffers is an excellent method of stabilizing aqueous poly(ethylene oxide) solution viscosity. It has also been disclosed that poly(ethylene oxide) which has been polymerized with alkaline earth catalysts contains traces of catalyst debris ("ash") which are alkaline and provide some degree of stability in aqueous solution. However, if the "ash" content is decreased, extracted or neutralized, polymer instability becomes a problem. Thus, it will readily be seen that the problem of stabilizing aqueous solutions of poly (ethylene oxide) are unique indeed.

Accordingly, it is an object of the present invention to provide a process for stabilizing poly(ethylene oxide).

Another object is to provide a process for stabilizing aqueous solutions of high molecular weight polymers of ethylene oxide against degradation induced by ultraviolet radiation, acid catalysts and oxidation occurring in the presence of pure oxygen at elevated temperature.

These and other objects will be apparent from the following description of the invention.

Broadly contemplated, there is provided a process for stabilizing aqueous solutions of poly(ethylene oxide) which comprises incorporating a stabilizing amount of manganous ion in the aqueous solution of poly(ethylene oxide), preferably from $1\times10^{-10}$ to $1\times10^{-1}$ mols per liter and most preferably from $1\times10^{-6}$ to $1\times10^{-3}$ mols per liter. The term "stabilizing amount" as used herein means the amount of manganous ion which is sufficient to stabilize aqueous solutions of poly(ethylene oxide) against degradation induced by ultraviolet radiation, acid catalysts, and oxidation occurring in the presence of pure oxygen at elevated temperature.

Polymers of ethylene oxide contain the basic structural unit $(-CH_2CH_2O-)_n$, wherein the integer $n$ can vary from small integral values up to $2\times10^5$ or even greater.

Polymers of ethylene oxide which find use as solvent thickeners or are used to form films generally have a minimum molecular weight of 100,000 and can range upward to 10,000,000 or more. Polymers of lower molecular weight are generally not considered to be efficient thickeners and are too friable to be employed as film formers. However, they do find wide usage as waxes, humectant, etc. This is particularly true for those species ranging upward to 20,000 in molecular weight. Although, the present invention can protect aqueous solutions of poly(ethylene oxide) of any molecular weight over a full range, it is primarily concerned with protecting the physical properties of films and the solution viscosity of thickened solvents. Hence the molecular weight limitations of this patent extends upwards from 100,000. It is emphasized that this limitation is one of polymer applicability rather than stabilizer effectiveness.

This molecular weight limitation can be defined in terms of the reduced viscosity.

The definitions and experimental determination of reduced viscosity is well known to those versed in the art and well summarized in the work of H. S. Frisch and Robert Simha entitled "The Viscosity of Colloidal Suspensions and Macromolecular Solutions," Chapter 14, pp. 525–613 in "Rheology" volume 1, by F. R. Eirich, Academic Press, N.Y. 1956. For this application it will be sufficient to state that the reduced viscosity is $\eta_r$ where $$\eta_r = \frac{(V_s - V_a)/V_a}{C} \qquad (I)$$

and $V_S$ = viscosity of polymer solution having a polymer concentration of C grams/deciliter of sol.
$V_s$ = viscosity of pure solvent.

Using water solvent at 30° C., polymers of ethylene oxide having molecular weights of 20,000 and 100,000 have reduced viscosity values of about 0.2 and 1.1 respectively, when determined at 0.200 gram/deciliter. Thus, the process of the present invention is limited to polymers of ethylene oxide having a reduced viscosity value of at least about 1.1 using water as a solvent at 30° C., when determined at 0.200 gram/deciliter.

Reduced viscosity data can be correlated to molecular weight of poly(ethylene oxide) over a wide range, by combining Equations II and III.

$$\eta_r = [\eta] + k'C[\eta]^2 \quad (II)$$

$$[\eta_r] = 12.5 \times 10^{-5} \, MW^{0.78} \quad (III)$$

In Equations II, III the terms $\eta_r$ and C have the previously defined meaning and $[\eta]$ = intrinsic viscosity
$k'$ = Huggins constant = about 0.5
MW = viscosity average molecular weight of the polymer.

The present invention also applies to water soluble copolymers, terpolymers and higher interpolymer of ethylene oxide with other hydrocarbon-substituted ethylene oxides, preferably copolymers and terpolymers which contain at least 75 mol percent ethylene-oxy units with remaining 25 mol percent made up of one or more of the units propylene-oxy. Examples of the preferred copolymers and terpolymers of ethylene oxide and propylene oxide, copolymers of ethylene oxide and 1,2-butylene oxide, copolymers of ethylene oxide and styrene oxide, copolymers of ethylene oxide and 2,3-butylene oxide, terpolymers of ethylene oxide, 1,2-butylene oxide and styrene oxide, terpolymers of ethylene oxide, propylene oxide and 2,3-butylene oxide and the like. The copolymer, terpolymer and high interpolymers useful in this invention are water soluble and are characterized by reduced viscosities in acetonitrile at 30° C.

The preparation of poly(ethylene oxide) is extensively described in the art and hence no detailed discussion for its preparation is deemed necessary for purposes of the present invention. Merely as illustrative, the following U.S. patents describe processes and techniques for the preparation of poly(ethylene oxide); U.S. Pats. Nos. 3,127,371; 3,214,387; 3,275,998; 3,398,199; and 3,399,149.

The amount of manganous ion added to the aqueous solution of poly(ethylene oxide) can be varied over a relatively wide range such as from $1 \times 10^{-10}$ to $1 \times 10^{-1}$. Preferred amounts of manganous ion in the aqueous solution is about $1 \times 10^{-6}$ to $1 \times 10^{-3}$ mols/liter range. As a general rule, by employing amounts of manganous ion in the $1 \times 10^{-6}$ to $1 \times 10^{-3}$ mols/liter range, aqueous solutions of poly(ethylene oxide) can maintain stable viscosities for periods ranging up to 100 days or more. The manganous ion can be supplied to the solution by various conventional techniques known to the art. A convenient technique is to add a compound, such as a manganous salt, to the aqueous solution in an amount sufficient to provide the quantity of manganous ion in solution as above indicated. Merely as illustrative, the following are convenient sources of manganous ion; $MnCl_2 \cdot 4H_2O$, $MnSO_4$ and $Mn(C_2H_3O_2)_2 \cdot 4H_2O$.

The following examples illustrate the present invention.

EXAMPLE I

This example demonstrates that manganous ($Mn^{++}$) ion stabilizes poly(ethylene oxide) against degradation in aqueous solution and that this influence, which is specific for manganous ion, is contrary to catalytic activity characteristics of most transition metal ions.

Poly(ethylene oxide) prepared according to the process disclosed in U.S. Pat. 3,214,387, utilizing an alkaline earth catalyst, and having an average molecular weight of about three to four million and reduced viscosity of about 45 dl./g. as measured at 0.200 gram/deciliter in water solvent at 30° C., was dissolved in deionized water to yield a 1.00 wt. percent aqueous solution. Metal cations and mobile anions were extracted from the polymer solution by cation exchange-anion exchange resin treatment. The polymer solution was found to contain substantially less than one part per million calcium ion. The solution was buffered to a pH of 6.48 with sodium acetate. Several different transition metal cations were added to aliquots of this polymer solution. The transition metal ion content and resultant solution viscosity decay is summarized in Table I. The air saturated solutions were stored in the dark at room temperature.

The results are indicated in Table I.

TABLE I.—THE EFFECT OF VARIOUS TRANSITION METAL CATIONS ON THE SOLUTION STABILITY OF PEO

| Transition ion | Salt added | Ion concentration, moles/liter | Polyox (PEO) concentration, grams/liter | Solution pH | Ambient Brookfield viscosity data, Spindle No. 2, 30 r.p.m. | | | |
|---|---|---|---|---|---|---|---|---|
| | | | | | 0 day | 1 day | 10 days | 100 days |
| None | | | 10.00 | 6.48 | 759 | 627 | 88 | <10 |
| Co++ | CoCl$_2$·6H$_2$O | 6.10×10$^{-4}$ | 10.00 | 6.49 | 748 | 640 | <10 | <10 |
| Cr+++ | Cr$_2$(SO$_4$)$_3$·18H$_2$O | 6.10×10$^{-4}$ | 10.00 | 6.32 | 627 | 308 | <10 | <10 |
| Fe+++ | FeCl$_3$·6H$_2$O | 6.10×10$^{-4}$ | 10.00 | 5.69 | 748 | 634 | 452 | 135 |
| Hg+ | HgCl | 6.10×10$^{-4}$ | 10.00 | 6.52 | 748 | 624 | 158 | <10 |
| Ni++ | NiCl$_2$·6H$_2$O | 6.10×10$^{-4}$ | 10.00 | 6.54 | 714 | 632 | 47 | <10 |
| Re+++ | ReCl$_3$ | 6.10×10$^{-4}$ | 10.00 | 6.42 | 763 | 230 | 20 | <10 |
| Zn++ | ZnCl$_2$ | 6.10×10$^{-4}$ | 10.00 | 6.50 | 627 | 598 | 370 | 38 |
| Stabilized with isopropyl alcohol | | (1) | 10.00 | 6.61 | 752 | 735 | 675 | 655 |
| Mn++ | MnCl$_2$·4H$_2$O | 6.10×10$^{-4}$ | 10.00 | 6.50 | 748 | 745 | 737 | 701 |

1 0.56 mole/liter of alcohol.

EXAMPLE II

This example demonstrates the fact that the stabilizing activity of manganous ion is not limited to poly(ethylene oxide) prepared from a given polymerization catalyst.

Poly(ethylene oxide) prepared from an alkyl zinc compound and suitable co-catalyst, as disclosed in U.S. Pats. 3,399,149; 3,398,199; 3,275,998 and 3,127,371, and having zinc present as the major metal in the polymer ash (rather than calcium as in the case of Example I) and having an average molecular weight of about 260 thousand and a reduced viscosity of about 2.5 dl./g. as measured at 0.200 gram/deciliter in water solvent at 30° C. is dissolved in deionized water to yield a 1.00 wgt. percent aqueous solution. Metal cations are extracted from the polymer solution by cation exchange resin treatment. Following ion exchange resin treatment, the solution pH was found to be 4.41. The effect of $7.16 \times 10^{-5}$ mols/liter of manganous ion on the long term viscosity stability of this solution is summarized in Table II.

As will be seen from Tables I and II, in acid solution, manganous ion can stabilize poly(ethylene oxide) that has been polymerized either with alkaline earth catalysts or with alkyl zinc compound and suitable co-catalysts.

TABLE II.—THE EFFECT OF MANGANOUS ION ON THE SOLUTION VISCOSITY STABILITY OF POLY(ETHYLENE OXIDE) POLYMERIZED WITH AN ALKYL ZINC COMPOUND

| Transition metal ion, moles/liter | Salt added | Solution pH | Ambient Brookfield viscosity data, Spindle No. 1/60 r.p.m. (cps.) | | | | |
|---|---|---|---|---|---|---|---|
| | | | 0 day | 1 day | 5 days | 25 days | 85 days |
| None | | 4.41 | 75.5 | 68.0 | 47.5 | 15.4 | <5.0 |
| $7.16 \times 10^{-5}$, $Mn^{++}$ | $MnCl_2 \cdot 4H_2O$ | 4.41 | 75.4 | 72.5 | 63.9 | 55.0 | 52.4 |

EXAMPLE III

This example shows that manganous ion can stabilize the solution viscosity of 10 wgt. percent "mineral acids" thickened with poly(ethylene oxide).

Poly(ethylene oxide) prepared as described in Example I, and having an average molecular weight of 600 thousand and a reduced viscosity value of 5.5 dl./g. as measured at 0.200 gram/deciliter in water solvent at 30° C. is dissolved in deionized water to prepare a 5.00 wgt. percent solution of poly(ethylene oxide). The debris remaining from the polymerization catalyst is allowed to remain; the solution is not treated with ion exchange resin. Aliquots of this polymer solution which are diluted with concentrated acids and deionized water to yield solutions which contain 4.00 wgt. percent poly(ethylene oxide) and 10.0 wgt. percent acid. The acid solvents were tested and resultant solution viscosity stabilities are summarized in Table III.

As will be seen from Table III, manganous ion present at levels of $2.25 \times 10^{-3}$ and $7.51 \times 10^{-5}$ moles/liter can effectively stabilize poly(ethylene oxide) thickened solutions of 10 wgt. percent phosphoric, sulfuric, hydrochloric and acetic acid. Without any manganous ion, the viscosity stability of these acid solutions is quite poor.

In 10 wgt. percent nitric acid solutions thickened with unstabilized poly(ethylene oxide), the rate of solution viscosity decay is much slower and unaffected by the presence of manganous ion.

EXAMPLE IV

This example demonstrates manganous ion can stabilize viscosity of poly(ethylene oxide) solutions exposed to intense ultraviolet radiation.

Poly(ethylene oxide) prepared by the process disclosed in U.S. Pat. No. 3,214,387 and having an average molecular weight of greater than five million and a reduced viscosity of about 50 dl./g. (at 0.200 g./dl.) as measured in water solvent at 30° C. is dissolved in water to yield a 1.00 wgt. percent aqueous solution. The debris remaining from the polymerization catalyst is allowed to remain; the solution is not treated with ion exchange resin. One ml. aliquots of this aqueous methanolic manganous ion solutions are introduced into 210 ml. aliquots of this aqueous poly(ethylene oxide) solution. The solutions are stored in Pyrex glass bottles which are positioned 10–11" away from a unfiltered Hanovia ultraviolet lamp. Table IV defines the concentration of manganous ion in each aliquot and summarizes the resultant solution viscosity of decay.

TABLE IV.—THE EFFECT OF MANGANOUS ION ON THE STABILITY OF POLY(ETHYLENE OXIDE) SOLUTIONS EXPOSED TO ULTRAVIOLET RADIATION

| Polyox (PEO) concentration, grams/liter | $Mn^{++}$ ion concentra- moles/liter | Solvent in which $Mn^{++}$ dissolved | Ambient Brookfield viscosity data Spindle No. 2/12 r.p.m. (cps) | | |
|---|---|---|---|---|---|
| | | | 0 hour | 72 hours | 144 hours |
| 10.00 | None | None | 2,140 | 280 | <25 |
| 10.00 | $8.50 \times 10^{-5}$ | 5.00 ml. $CH_3OH$ | 2,120 | 1,560 | 925 |
| 10.00 | $7.60 \times 10^{-4}$ | 5.00 ml. $CH_3OH$ | 2,100 | 1,975 | 1,775 |
| 10.00 | $7.55 \times 10^{-4}$ | 5.00 ml. $H_2O$ | 2,150 | 1,730 | 1,310 |
| 10.00 | $7.60 \times 10^{-3}$ | 50.0 ml. $CH_3OH$ | 2,050 | 1,990 | 1,970 |
| 10.00 | None | 5.0 ml. $CH_3OH$ | 1,920 | | |

EXAMPLE V

This example demonstrates that aqueous solutions of poly(ethylene oxide) can be stabilized by adding manganous ion over a broad range of dilute concentrations.

Using the same poly(ethylene oxide) and procedures described in Example I, varying amounts of manganous chloride are added to aliquots of an aqueous solution containing 1.00 wgt. percent poly(ethylene oxide). The concentrations of manganous ion present and the resultant solution stabilities are summarized in Table V.

TABLE III.—THE EFFECT OF MANGANOUS ION ON THE SOLUTION VISCOSITY STABILITY OF "MINERAL ACIDS" THICKENED WITH POLY(ETHYLENE OXIDE)

| Acid solvent | $Mn^{++}$ concentration, moles/liter | Polyox (PEO) concentration, grams/liter | Solution viscosity data, Cannon-Fenske Series 500 capillary centistokes at 25.0° C. | | |
|---|---|---|---|---|---|
| | | | 0 day | 25 days | 50 days |
| 10% $H_4PO_4$ | $2.25 \times 10^{-3}$ | 40.0 | 750 | 690 | 670 |
| | $7.51 \times 10^{-5}$ | 40.0 | | 575 | 560 |
| | None | 40.0 | 800 | 60 | 20 |
| 10% $H_2SO_4$ | $2.12 \times 10^{-3}$ | 40.0 | 475 | 415 | 397 |
| | $7.51 \times 10^{-5}$ | 40.0 | 445 | 400 | 397 |
| | None | 40.0 | 445 | 95 | 30 |
| 10% HCl | $2.14 \times 10^{-3}$ | 40.0 | 360 | 315 | 310 |
| | $7.51 \times 10^{-5}$ | 40.0 | 360 | 300 | 280 |
| | None | 40.0 | 360 | 55 | 20 |
| 10% acetic acid | $2.17 \times 10^{-3}$ | 40.0 | 395 | 285 | 250 |
| | $7.51 \times 10^{-5}$ | 40.0 | 395 | 275 | 245 |
| | None | 40.0 | 395 | 55 | 20 |
| 10% $HNO_3$ | $2.15 \times 10^{-3}$ | 40.0 | 430 | 295 | 250 |
| | $7.51 \times 10^{-5}$ | 40.0 | 440 | 305 | 260 |
| | None | 40.0 | 475 | 325 | 270 |

TABLE V.—THE EFFECT OF VARYING CONCENTRATIONS OF MANGANOUS ION ON THE SOLUTION VISCOSITY STABILITY OF POLY(ETHYLENE OXIDE)

| Concentration Manganous ion, $Mn^{++}$, moles/liter | Salt added | Grams $Mn^{++}$ gram Polyox PEO | Solution pH | Ambient Brookfield viscosity data, Spindle No. 2/12 r.p.m. (cps.) | | | | |
|---|---|---|---|---|---|---|---|---|
| | | | | 0 day | 1 day | 10 days | 25 days | 100 days |
| None | None | None | 6.52 | 892 | 843 | 183 | 12 | 10 |
| $8.64 \times 10^{-6}$ | $MnCl_2 \cdot 4H_2O$ | 0.0000474 | 6.52 | 887 | 873 | 836 | 835 | 799 |
| $5.77 \times 10^{-4}$ | $MnCl_2 \cdot H_2O$ | 0.00317 | 6.52 | 865 | 858 | 837 | 846 | 825 |
| $6.25 \times 10^{-2}$ | $MnCl_2 \cdot 4H_2O$ | 0.343 | 6.10 | 877 | 886 | 875 | 883 | 903 |

EXAMPLE VI

This example demonstrates that manganous ion retards the rate of ultaviolet induced degradation of poly(ethylene oxide) films.

Using the catalyst described in Example I, ethylene oxide is polymerized to an average molecular weight of about 400,000 which yields a reduced viscosity of 3.5 as measured at 0.200 g./dl. concentration in water at 30° C. This polymer is dissolved in methylene chloride solvent to yield a 5.0 wgt. percent solution. A polymer film is cast on a glass plate by evaporating the solvent from an aliquot of the solution. A weighed sample of 0.0216 gram of finely ground manganous chloride powder is thoroughly mixed in a 200 ml. aliquot of the poly(ethylene oxide)/methylene chloride solution. By visual observation, substantially all of the manganous chloride remains undissolved. A second film is cast from this solution. Both films are exposed to the unfiltered ultraviolet radiation emitted from a Hanovia lamp. Polymer degradation of both films is followed by reduced viscosity determinations. The results are summarized in Table VI.

TABLE VI.—THE EFFECT OF MANGANOUS ION ON THE STABILITY OF POLY(ETHYLENE OXIDE) FILMS EXPOSED TO ULTRAVIOLET RADIATION

| Exposure to ultraviolet radiation (hours) | Reduced viscosity value obtained at 2.00 g./dl. | |
|---|---|---|
| | Stabilized Polyox (PEO) | Unstabilized Polyox (PEO) |
| 0 | 3.47 | 3.54 |
| 4 | 2.25 | 1.60 |
| 28 | 1.68 | 0.700 |
| 192 | 0.800 | 0.200 |

EXAMPLE VII

This example demonstrates that manganous ion retards the rate of oxygen consumption of aqueous solutions of poly(ethylene oxide) (same solution described in Example I) when oxidized at 70° C. for two hours. During this time, pure oxygen is purged through the solution and continuously recycled. It was noted that 37.8 ml. of $O_2$ (750 mm. press., 70° C.) were consumed by the oxidation of 1.000 gram of poly(ethylene oxide); most of this oxygen was consumed during the first twelve minutes. When the procedure was repeated using a fresh solution containing 2.000 grams of poly(ethylene oxide) and $7.9 \times 10^{-5}$ moles/liter of manganous ion, it was found that 1.5 ml. of $O_2$ were consumed during the same two hour interval. This amount of oxygen barely exceeds the sensitivity limits of the experimental apparatus.

Although the invention has been illustrated by the preceding examples, the invention is not to be construed as limited to the materials employed in the above-exemplary examples, but rather, the invention encompasses the generic area as hereinbefore disclosed. Various modifications and embodiments of this invention can be made without departing from the spirit and scope thereof.

What is claimed is:

1. A process for stabilizing aqueous solutions of poly(ethylene oxide) against molecular weight degradation, wherein said poly(ethylene oxide) has a molecular weight of at least 100,000, which comprises adding a stabilizing amount of manganous ion to said aqueous solution of poly(ethylene oxide).

2. A process according to claim 1 wherein said manganous ion is added to said aqueous poly(ethylene oxide) solution in an amount of at least 0.047% by weight based on the weight of said poly(ethylene oxide).

3. A process according to claim 1 wherein said aqueous poly(ethylene oxide) solution is an acidic solution.

References Cited

UNITED STATES PATENTS

| 3,041,291 | 6/1962 | Bailey et al. | 260—29.2 |
| 3,095,394 | 6/1963 | McGary | 260—29.2 |
| 3,278,473 | 10/1966 | Judd | 260—29.2 |
| 3,242,115 | 3/1966 | McGary | 260—29.2 |

FOREIGN PATENTS

| 779,054 | 7/1957 | Great Britain | 260—45.75 |

DONALD J. ARNOLD, Primary Examiner

A. H. KOECKERT, Assistant Examiner

U.S. Cl. X.R.

260—45, 75